May 1, 1934.  T. J. BRIMER  1,957,315
FROZEN CONFECTION MACHINE
Filed June 3, 1932   3 Sheets-Sheet 1

Inventor
T. J. Brimer

Roth & Roth
Attorneys

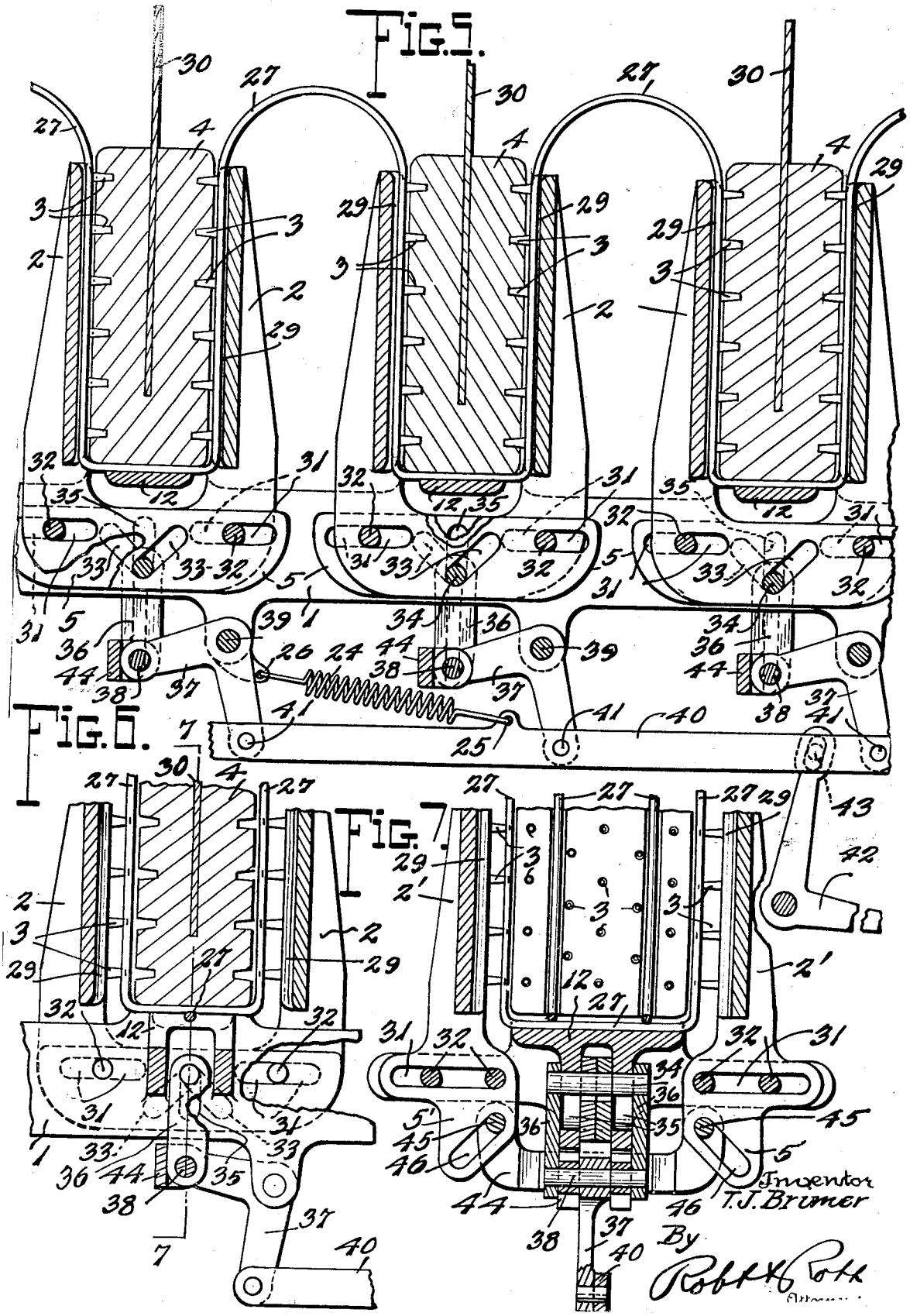

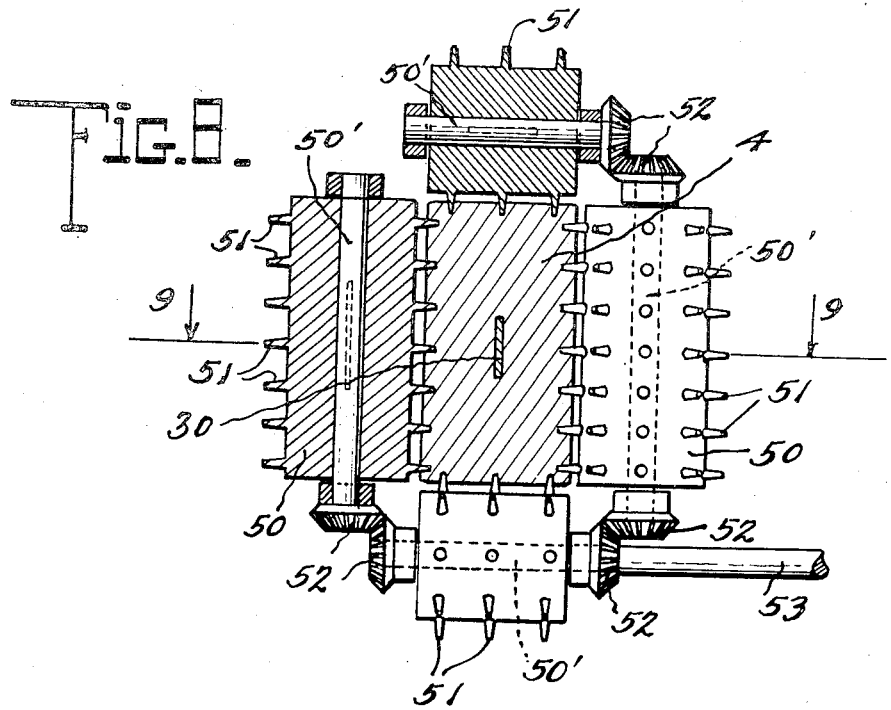
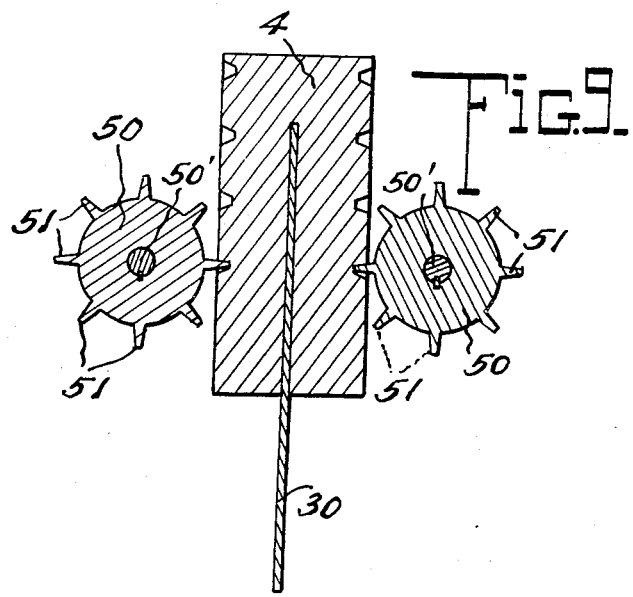

Patented May 1, 1934

1,957,315

UNITED STATES PATENT OFFICE 1,957,315

FROZEN CONFECTION MACHINE

Thomas J. Brimer, Brooklyn, N. Y., assignor to Good Humor Corporation of America, New York, N. Y.

Application June 3, 1932, Serial No. 615,110

4 Claims. (Cl. 107—8)

This invention relates to frozen confection machines and more particularly to a machine which is adapted to act on the frozen body of the confection to prepare the same for the application of an edible coating thereto.

In the manufacture of frozen confections of the type disclosed in the Burt Patents Nos. 1,470,524, 1,470,525, and 1,718,997, a block or cake of ice cream, frozen custard, water ice, or other frozen body is provided with a stick or core member frozen into said block or body and having one end projecting therefrom to constitute a handle. The body is then dipped into a coating material, generally chocolate or other analogous substance to cover the body, the coating becoming hardened or frangible after performing the dipping operation to provide an edible casing about the confection body. In the application of such a coating to a frozen body as above mentioned, the coldness of the block of ice cream or other material tends to prevent adhesion of the coating to the body and maintains the coating frangible, thereby preventing the attainment of a good mechanical bond between the coating and the confection body. To prevent the coating from readily breaking away from the body and dropping off during consumption of the confection, it has been found desirable to provide the confection body with means for mechanically bonding the coating securely to the confection body.

In my co-pending application Serial No. 614,014, filed May 27, 1932, the broad idea of mechanically bonding an edible coating with a frozen confection body is disclosed. This may be accomplished by the formation of grooves or small indentations, recesses or pockets in the faces of the confection body before the application of the coating thereto, these grooves or indentations being formed in any suitable manner. By then dipping the confection body in the molten coating mix or other coating material, the material will enter the grooves or indentations and firmly secure the coating to the confection body when the coating congeals or hardens.

The above mentioned co-pending application is directed to a frozen confection product whereas the present application is directed to apparatus for forming the recesses or indentations in the frozen body to provide for the mechanical bonding of the coating with the body.

A further object of the invention is to provide a frozen confection machine having one or more movable members carrying a plurality of projections or protuberances on the faces thereof, said members being arranged to be brought into engagement with the frozen body of a confection to form recesses in the faces of said body.

A still further object of the invention is to provide an apparatus for forming recesses or pockets in a plurality of faces of the confection body simultaneously.

Another object of the invention is to provide an apparatus for operating on a plurality of confection bodies simultaneously to prepare the same for mechanically bonding a coating therewith.

Other and further objects and advantages of the invention will be hereinafter set forth and the novel features thereof defined by the appended claims.

In the drawings:

Fig. 5 is a fragmentary side elevation of a modified form of apparatus arranged to accommodate a plurality of confection bodies simultaneously, certain of the parts being broken away and shown in section;

Fig. 6 is a fragmentary detail view of one of the units shown in Fig. 5 with the parts positioned for removal of the confection body from the apparatus after the formation of the recesses or pockets therein, certain of the parts being shown in section;

Fig. 7 is a cross sectional view taken approximately on the line 7—7 of Fig. 6;

Fig. 8 is a view, partly in section, of a further modified construction, and

Fig. 9 is a cross sectional view taken approximately on the line 9—9 of Fig. 8.

Figure 1:
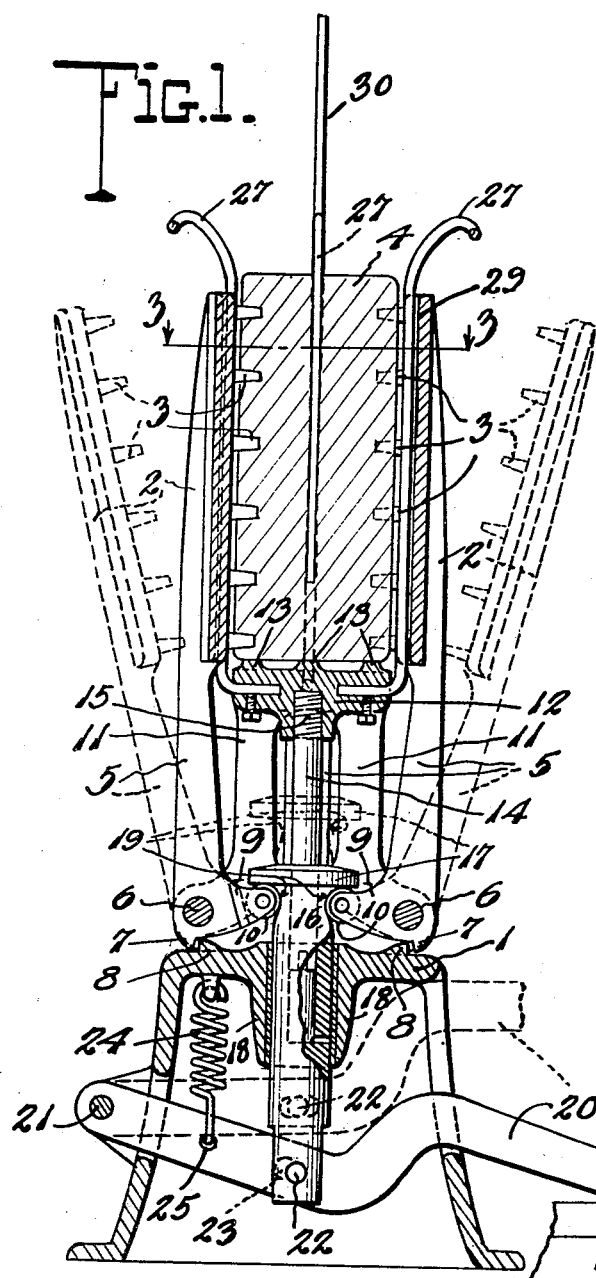
Fig. 1 is a side view of one form of apparatus forming the embodiment of the present invention, certain of the parts being broken away and shown in section.
Figure 2:
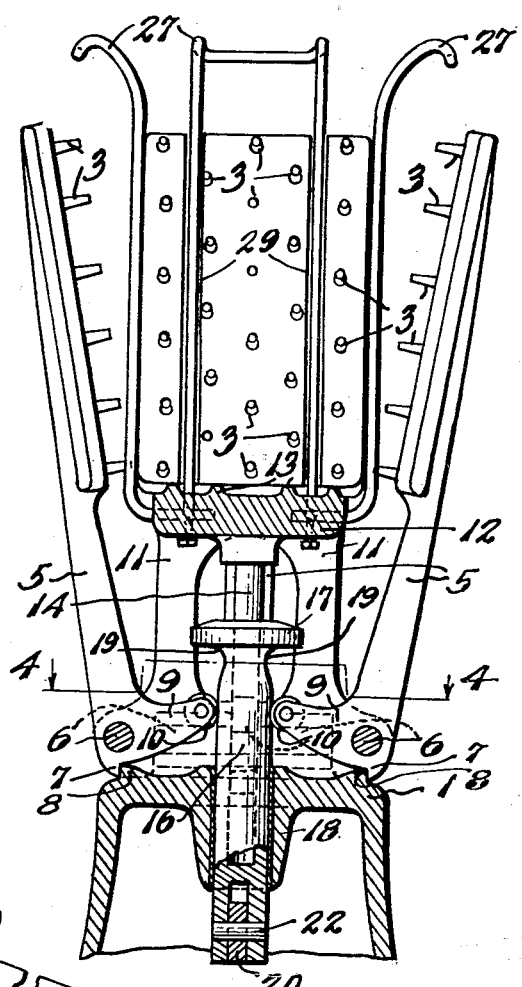
Fig. 2 is a fragmentary view of the apparatus shown in Fig. 1 taken at right angles to the showing of Fig. 1, certain of the parts being broken away and shown in section.
Figures 3, 4:
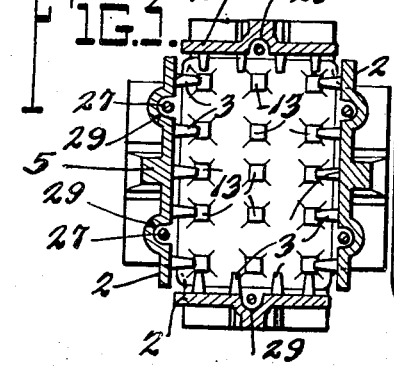
Fig. 3 is a cross sectional view taken approximately on the line 3—3 of Fig. 1.
Fig. 4 is a cross sectional view taken approximately on the line 4—4 of Fig. 2.

Like reference characters designate corresponding parts in the several figures of the drawings. Referring first to the form of apparatus illustrated in Figs. 1 to 4, 1 denotes a base or frame having pivotally mounted thereon members 2 in the form of plates or jaws having projections or protuberances 3 extending from the inner faces thereof. These plates are preferably arranged in pairs disposed at right angles to each other, the plates of each pair being spaced to receive a substantially rectangular frozen confection body 4 therebetween. Arms 5 extend from the lower extremity of the plates to pivots 6 for hingedly or rockably mounting the plates on the frame 1, the arms being provided adjacent the pivots with abutments or stop members 7 for cooperating with abutments or stop members 8 to limit the outward or opening movement of the plates. Also formed on the arms are extensions 9 preferably having at the free extremities thereof rollers 10 rotatably carried thereby for purposes hereinafter described.

Carried by frame 1 in any suitable manner as by standards 11 is a base plate 12 which may also be provided with projections or protuberances 13 if desired for engaging the lower face or end of the confection body when positioned in the apparatus, this base plate being arranged in such position as to support the confection body at the proper elevation to present its side faces opposite the plates 2 for the formation of the pockets or recesses by the projections 3.

Extending centrally of the apparatus intermediate the base plate 12 and the frame 1 is a guide 14 fixed to the base plate 12 as by screw threads 15, the guide having slidably mounted thereon a tubular bushing 16 having at its upper extremity a flange 17 cooperating with rollers 10 carried by the extensions 9 on the plate arms 5, the frame 1 being provided with a centrally disposed guide bearing 18 for assisting in guiding the bushing 16 in its movements about the guide 14. The bushing is provided with a reduced neck or annular groove 19 adjacent the flange 17 for receiving the rollers 10 and to permit rocking of the plates 2 into engagement with the confection body. Movement of the bushing 16 on the guide 14 and in the guide bearing 18 is accomplished by means of a hand or foot lever 20 pivotally connected to the frame 1 as at 21 and to the lower extremity of the bushing as at 22, the bushing being bifurcated at its lower end to receive the lever 20, and the lever 20 being provided with an elongated slot 23 to accommodate the pivot pin 22 in the various positions of the lever 20 during operation of the apparatus. A spring 24 connected at one end as at 25 to the lever 20 and at its other end to the frame as at 26 normally maintains the apparatus in position for receiving and removing the confections. If desired, guards 27 may be employed to facilitate the reception and removal of the confections 4, the guards being shown in the form of bent wire carried by the base plate 12, the upper ends of the guards being bent outwardly to provide a large opening therebetween for the introduction of the confections into the apparatus. If desired, the guards may be so constructed as to permit their removal as by loosening set screws 28. The plates 2 may be grooved if desired as at 29 to permit the same to be moved into position for forming the recesses in the confection body 4 by the projections 3 carried by the plates. These grooves are not necessary, however, if the projections 3 are made sufficiently long to permit elimination of the grooves.

The operation of the apparatus above described should be obvious from the foregoing and may be briefly summarized as follows. Assuming the parts to be in the position shown by the dotted lines in Fig. 1 and by the full lines in Fig. 2, a confection body 4 carrying the stick or core 30 is inserted between the guards 27 and is moved downwardly between the guards until it rests firmly on the base plate 12. Upon reaching this position, the hand or foot lever 20 is manipulated by a downward motion, thereby drawing the bushing 16 downwardly until the flange 17 engages the rollers 10. Further downward movement of the lever 20 and the bushing 16 causes the extensions 9 and arms 5, constituting a bell crank lever, to be rocked or swung about pivots 6 to bring the plates 2 towards the confection body 4, the projections 3 carried by the plates entering the faces of the confection body and forming the recesses or indentations in an obvious manner. The annular groove or reduced neck 19 on the bushing permits of this rocking action induced by the downward movement of the bushing flange 17 against the rollers 10. After performing the above operation, the lever 20 is released and the spring 24 returns the parts to a normal or open position, the bushing being moved upwardly under the influence of the spring, camming the rollers 10 out of the annular groove 19 to rock the arms 5 and plates 2 carried thereby to an open position, the stop members 7 and 8 limiting the outward movement or opening of the plates. The confection may then be removed by the handle 30 and is ready for the dipping or coating operation, which coating will be securely bonded to the confection body by means of the indentations formed therein.

While the apparatus has been shown in Figs. 1 to 4 as accommodating a single confection body, it will be apparent that a plurality of interconnected units may be employed to permit a plurality of confections to be formed with the indentations or recesses simultaneously. As shown in Patent No. 1,809,190, granted June 9, 1931, a device for gripping and handling a plurality of confections simultaneously is shown, and this device may be readily employed in conjunction with the above described apparatus as well as the apparatus shown in Figs. 5 to 7, hereinafter described for the positioning and removal of a plurality of confections simultaneously.

It is to be understood that while the projections 3 have been shown in the form of circular or rectangular pins arranged in spaced relation on the plates 2, I do not wish to be limited to the use of pins nor to any definite arrangement of the same on the plates. In lieu of pins, ribs formed on the plates may be employed to form grooves in the confection body as disclosed in my copending application hereinbefore referred to. If desired, the ribs or pins may be arranged on the plates to form a fanciful design in the confection body, the ribs or pins being used separately or in combination for this purpose.

It is also to be understood that I do not wish to be limited to a substantially rectangular form of confection since the apparatus may be readily modified to accommodate a circular or other form. Nor do I wish to be limited to the use of my apparatus for stick confections since it is equally effective for conditioning any confection body, with or without a stick or core for mechanical bonding of a coating therewith when subsequently applied thereto.

Referring now to the apparatus illustrated in Figs. 5 to 7, the general arrangement is the same except that in this form the plates are movable towards and from each other in a straight line as distinguished from a swinging or hinged movement in the first mentioned form, Figs. 1 to 4. Plates 2 carrying the protuberances or projections 3 are provided with arms 5 arranged in overlapping and sliding relation to each other, each of the arms being provided with elongated guide slots 31 through which guide pins 32 extend to maintain a straight line movement of the plates towards and from each other. Additional slots 33 angularly disposed in arms 5 having an actuating pin 34 extending therethrough cause movement of the plates towards and from each other by vertical movement of pin 34 in slot 35 formed in frame 1. Pin 34 is carried by an arm or link 36 having one end pivotally connected to a bell crank lever 37 as at 38. The bell crank lever is pivotally carried by the frame 1 as at 39 and is connected to an actuating bar 40 as at 41, the bar in turn being suitably connected to a foot or hand lever 42 as at 43. Spring 24 having one end fixed to the frame 1 as at 26 and the other end connected to said actuating bar 40 as at 25 maintains the apparatus in a normal or open position.

As shown in Fig. 5, the plates 2 are arranged in units to accommodate a plurality of confections simultaneously, the guards 27 assisting in the positioning of the confection bodies in the machine to rest on the base plates 12 at the proper elevation for engagement by the projections 3 of the plates to form the indentations or recesses. In both forms of the apparatus illustrated, the guards 27, in addition to facilitating the introduction and removal of the confections, also serve to maintain the confections stationary during the withdrawal of the projections from the body on the opening or outward movement of the plates, thereby minimizing the possibility of sticking of the confection body to one or other of the plates or chipping off of portions of the confection body adjacent the recesses incident to the withdrawal of the projections.

In Figs. 5 and 6, the plates cooperating with the wide faces of the confection body are shown, together with the mechanism for actuating said plates, while Fig. 7 shows a further pair of plates disposed at right angles to the above mentioned plates and in a manner in which these plates will be operated simultaneously therewith. This is accomplished by providing a link member 44 connected to the pivot 38 connecting the bell crank 37 and arm 36, to be moved with this bell crank and arm when the actuating bar 40 is manipulated by the hand or foot lever 42. Link member 44 carries pins 45 which extend through angularly disposed slots 46 in the arms 5' of the plates. These arms 5' are also provided with guide slots 31 through which extend spaced pins 32 carried by the frame 1 to maintain the straight line motion of the plates.

The operation of the apparatus shown in Figs. 5 to 7 may be briefly summarized as follows: Assuming each of the units to be in an open position as shown in Fig. 6, the confections are placed in the machine, if desired, by means of the handling apparatus disclosed in the above mentioned Patent No. 1,809,190, the proper spacing of the confections being readily obtained through the lazy tong connection carrying the stick gripping elements. By moving the hand or foot lever 42 downwardly, actuating bar 40 will be shifted to rock the bell crank 37 for each unit to pull the arms 36 and pins 34 downwardly in the inclined slots 33 formed in the overlapped arms 5 of the plates 2, thereby causing the plates to move inwardly and pressing the projections 3 into the confection body. At the same time, the rocking of the bell cranks 37 moves the links 44 downwardly, causing pins 45 to move downwardly in the inclined slots 46 formed in the arms 5', thereby moving plates 2' inwardly and causing the projections carried thereby to be pressed into the confection body. The guide pins 32 and slots 31 cause the plates to move in a straight line. Upon releasing the hand or foot lever 42 the plates will move outwardly under the influence of spring 24, withdrawing the projections from the confection body to leave the recesses or indentations therein. The confections may then be removed from the machine as by the handling apparatus above referred to, which may or may not have been left gripping the sticks 30 during the operation of the machine to form the indentations in the confection. The coating of the confection may then be carried out in the usual manner, resulting in a finished frozen confection product having a chocolate or other edible frangible coating mechanically bonded therewith.

While I have shown the use of projection or protuberance supporting plates disposed to operate on the complete peripheral surface of the confection body, that is, four plates in the case of a rectangular confection, it is to be understood that I do not wish to be confined to the same since it may be desirable only to use a single pair of plates operating on either the wide or narrow faces of the confection body, or in the case of a confection body having a substantially square cross section, on only two sides of the body. It is also possible to operate on the complete peripheral surface of the confection body by means of a single pair of plates by successive operations of the plates and partial rotation of the confection body between each successive operation.

As hereinbefore mentioned in conjunction with the apparatus illustrated in Figs. 1 to 4, the form shown in Figs. 5 to 7 is not limited to use with stick confection since it is just as desirable to manufacture confections such as the well-known Eskimo pie and others of a similar nature in the same manner insofar as the mechanical bonding of the coating to the ice cream, ice or other frozen body is concerned. When employing the handling apparatus for introducing and removing a plurality of confections simultaneously, the guards 27 serve to automatically space the confections to facilitate their introduction into the machine. They also facilitate the introduction of the confection bodies into the machine by hand and prevent sticking of the confection body to the plates as the projections are withdrawn therefrom.

As a further modified form of the invention, Figs. 8 and 9 illustrate an apparatus embodying a plurality of rotatable members or rollers 50 arranged to receive a confection body 4 therebetween, certain or each of the rollers carrying a plurality of projections 51 in the form of pins or ribs as hereinbefore mentioned with relation to the other forms of the apparatus, these projections being adapted to form recesses in the body of the confections as it is passed between the rollers. The rollers are fixed to shafts 50' suitably mounted in a frame (not shown) and if desired, the rollers may be suitably geared as by gears 52 to a drive shaft 53 for positively driving the rollers, the power source for the drive shaft being a motor or the like (not shown) or a hand driven mechanism. The confection bodies may be fed through the space intermediate the rollers by hand or otherwise as desired, as by a conveyor on which the confection bodies may be placed one behind the other to provide for a continuous feed.

While the rollers have been shown as being disposed to conform to the shape of the confection body, it is to be understood that I do not wish to be limited to the use of a plurality of rollers for operating on the complete peripheral surface of the body simultaneously, since one roller and a spaced guide wall, or a single pair of rollers may be utilized and the body passed through the intermediate space a number of times, turning the body to present a portion of the unrecessed surface after each passage through the rollers.

Nor do I wish to be limited to the use of positively driven rollers since the confection bodies may be pushed past the rollers in any suitable manner whereby the movement of the confection body will actuate the rollers and cause the projections carried thereby to form the recesses in the confection body.

This form of apparatus shown in Figs. 8 and 9 may be likewise used to operate on confection bodies which do not have a stick or core.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In apparatus of the class described, a frame, a plurality of movable members slidably carried by said frame, said movable members having projections thereon for forming recesses in a confection body and having arms provided with elongated slots therein for guiding said projection carrying members in their sliding movements, guide pins carried by said frame and cooperating with said slots, and means for slidably moving said projection carrying members towards and from said confection body.

2. In apparatus of the class described, a frame, a plurality of movable members slidably carried by said frame, said movable members having projections thereon for forming recesses in a confection body and having arms provided with elongated slots therein for guiding said projection carrying members in their sliding movements, guide pins carried by said frame and cooperating with said slots, and means for slidably moving said projection carrying members towards and from said confection body, said means comprising a vertically movable link having an actuating pin adjacent one extremity, said arms having angularly disposed elongated slots therein cooperating with said actuating pin, and an actuating lever connected to said link for moving the same whereby to move said projection carrying members towards said confection body to form the recesses therein and away from said confection body to withdraw said projections from said recesses.

3. In apparatus of the class described, a frame, a plurality of movable members slidably carried by said frame, said movable members having projections thereon for forming recesses in a confection body and having arms provided with elongated slots therein for guiding said projection carrying members in their sliding movements, guide pins carried by said frame and cooperating with said slots, and means for slidably moving said projection carrying members towards and from said confection body, said means comprising a vertically movable link having an actuating pin adjacent one extremity, said arms having angularly disposed elongated slots therein cooperating with said actuating pin, an actuating lever connected to said link for moving the same whereby to move said projection carrying members towards said confection body to form the recesses therein and away from said confection body to withdraw said projections from said recesses, and means for normally maintaining said projection carrying members in such withdrawn position.

4. In apparatus of the class described, a frame, a plurality of movable members slidably carried thereby, said members having projections formed thereon for forming recesses in a confection body, and said members being arranged as a plurality of units for operating on a plurality of confection bodies simultaneously, and means for moving said members into and out of engagement with said confection bodies, said means including a plurality of vertically movable links having an actuating pin carried thereby adapted to cooperate with angularly disposed elongated slots in said movable projection carrying members, and an actuating lever connected to said links.

THOMAS J. BRIMER.